United States Patent
Laukkanen et al.

(10) Patent No.: US 9,809,655 B2
(45) Date of Patent: Nov. 7, 2017

(54) METHOD OF MODIFYING NANOFIBRILLAR CELLULOSE COMPOSITION

(71) Applicant: UPM-Kymmene Corporation, Helsinki (FI)

(72) Inventors: Antti Laukkanen, Helsinki (FI);
Markus Nuopponen, Helsinki (FI);
Martina Lille, Vantaa (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/907,405

(22) PCT Filed: Jun. 24, 2014

(86) PCT No.: PCT/FI2014/050508
§ 371 (c)(1),
(2) Date: Jan. 25, 2016

(87) PCT Pub. No.: WO2015/011337
PCT Pub. Date: Jan. 29, 2015

(65) Prior Publication Data
US 2016/0176989 A1    Jun. 23, 2016

(30) Foreign Application Priority Data

Jul. 26, 2013    (FI) ..................... 20135796

(51) Int. Cl.
| | | |
|---|---|---|
| *D21H 11/18* | (2006.01) | |
| *C08B 15/02* | (2006.01) | |
| *C08B 15/04* | (2006.01) | |
| *C08B 15/08* | (2006.01) | |
| *D21H 11/20* | (2006.01) | |
| *D21H 19/00* | (2006.01) | |
| *D21H 21/18* | (2006.01) | |
| *D21H 23/04* | (2006.01) | |
| *C09D 101/02* | (2006.01) | |
| *C09D 101/04* | (2006.01) | |
| *D21H 19/12* | (2006.01) | |
| *D21H 23/22* | (2006.01) | |

(52) U.S. Cl.
CPC .............. *C08B 15/02* (2013.01); *C08B 15/04* (2013.01); *C08B 15/08* (2013.01); *C09D 101/02* (2013.01); *C09D 101/04* (2013.01); *D21H 11/18* (2013.01); *D21H 11/20* (2013.01); *D21H 19/00* (2013.01); *D21H 19/12* (2013.01); *D21H 21/18* (2013.01); *D21H 23/04* (2013.01); *D21H 23/22* (2013.01)

(58) Field of Classification Search
CPC .... C08B 15/02; C09D 101/02; C09D 101/04; D21H 11/18; D21H 11/20; D21H 23/04
USPC ...................................... 162/157.6
See application file for complete search history.

(56) References Cited

U.S. PATENT DOCUMENTS

| | | | |
|---|---|---|---|
| 5,964,983 A | 10/1999 | Dinand et al. | |
| 6,348,436 B1 | 2/2002 | Langlois et al. | |
| 2010/0282422 A1 | 11/2010 | Miyawaki et al. | |
| 2013/0345416 A1* | 12/2013 | Laukkanen .......... | B01J 13/0069 536/85 |
| 2014/0058077 A1* | 2/2014 | Laukkanen ............ | B82Y 30/00 536/56 |
| 2014/0378676 A1* | 12/2014 | Lauraeus ................ | B01D 15/02 536/25.4 |
| 2015/0068973 A1* | 3/2015 | Bessonoff .............. | B01D 39/18 210/500.29 |
| 2015/0330023 A1* | 11/2015 | Hillebrand ............... | D21C 9/18 162/9 |
| 2016/0208153 A1* | 7/2016 | Hede ..................... | B24D 11/00 |

FOREIGN PATENT DOCUMENTS

| | | |
|---|---|---|
| EP | 2226414 A1 | 9/2010 |
| JP | 2009298972 A | 12/2009 |
| WO | 0047628 A2 | 8/2000 |
| WO | 2010092239 A1 | 8/2010 |
| WO | 2011064441 A1 | 6/2011 |
| WO | 2011068457 A1 | 6/2011 |
| WO | 2011118748 A1 | 9/2011 |
| WO | 2012043103 A1 | 4/2012 |
| WO | 2012107643 A2 | 8/2012 |
| WO | 2012119229 A1 | 9/2012 |
| WO | 2012168562 A1 | 12/2012 |
| WO | 2013072563 A1 | 5/2013 |
| WO | 2014068196 A2 | 5/2014 |

OTHER PUBLICATIONS

International Search Report dated Sep. 17, 2014; International Application No. PCT/FI2014/050508; Filed Jun. 24, 2014 (4 pages).
Karppinen, et al., "Flocculation of microfibrillated cellulose in shear flow" Cellulose (2012) vol. 19, pp. 1807-1819.
Written Opinion dated Sep. 17, 2014; International Application No. PCT/FI2014/050508; Filed Jun. 24, 2014 (6 pages).
Fall, et al., "Colloidal Stability of Aqueous Nanofibrillated Cellulose Dispersions" Langmuir vol. 27 (2011), pp. 11332-11338.
Iotti, et al., "Rheological Studies of Microfibrillar Cellulose Water Dispersions", J. Poly. Environ. vol. 19 (2011), pp. 137-145.
Kelco Co, Cellulose CMC book, 1st Edition, 2007 (28 pages).

* cited by examiner

*Primary Examiner* — Mark Halpern
(74) *Attorney, Agent, or Firm* — Cantor Colburn LLP

(57) ABSTRACT

The invention relates to a method for modifying nanofibrillar cellulose composition, comprising—preparing fibrous dispersion of ionically charged nanofibrillar cellulose (NFC), and—applying heat treatment at a temperature of at least 90° C. to the fibrous dispersion until the viscosity of NFC starts to decrease. The viscosity of the heat-treated NFC is reversible by applying shear forces to the NFC.

21 Claims, 15 Drawing Sheets

(A)

(B)

(A)

(B)

(C)

(A)

(B)

(C)

METHOD OF MODIFYING NANOFIBRILLAR CELLULOSE COMPOSITION

CROSS REFERENCE TO RELATED APPLICATIONS

This application is a National Stage application of PCT/FI2014/050508, filed Jun. 24, 2014, which claims the benefit of Finnish Application No. 20135796, filed Jul. 26, 2013, both of which are incorporated by reference herein in their entirety.

FIELD OF THE INVENTION

The present invention relates to a method for modifying nanofibrillar cellulose composition. The invention also relates to the modified nanofibrillar cellulose.

BACKGROUND OF THE INVENTION

Nanofibrillar cellulose refers to isolated cellulose microfibrils or microfibril bundles derived from cellulose raw material. Nanofibrillar cellulose (NFC), which is also known as microfibrillar cellulose (MFC), and by other related names, is a natural polymer that is abundant in nature. Generally, nanofibrillar cellulose has high aspect ratio and the fibril length can be up to several microns.

Traditionally, nanofibrillar cellulose production techniques are based on grinding or homogenizing of aqueous dispersion of pulp fibers. The concentration of nanofibrillar cellulose in dispersions is typically low, usually around 1-5%.

The production of nanofibrillar cellulose by fibrillating cellulose fibers into nano-scale elements requires intensive mechanical treatment. In order to produce purified cellulose or reduce energy demand, chemical treatment or enzymatic treatment may be applied prior or posterior to mechanical fibrillation, for breaking the fibrils and lowering the aspect ratio. These processes are often industrially tedious and expensive.

On the other hand, through the mechanical fibrillating process, the viscosity of the pulp fiber suspension increases during the process. Therefore, after the grinding or homogenization process, the obtained nanofibrillar cellulose material is a dilute viscoelastic hydrogel. However, for certain applications, a challenge associated with using NFC/MFC is the high viscosity in aqueous state.

Therefore, there is a need of easy-to-produce and cost-effective nanofibrillar cellulose having low viscosity and still preserving desirable properties of fibril cellulose.

SUMMARY OF THE INVENTION

It is a purpose of the invention to provide a novel method for modifying nanofibrillar cellulose composition of reversible low zero-shear viscosity and low yield stress. The concept "low viscosity" means in this context that a degree of viscosity close to that of nanocrystalline cellulose or cellulose whiskers can be attained.

In the present method, modified nanofibrillar cellulose of low zero-shear viscosity is prepared by applying heat treatment at a temperature of at least 90° C. to the fibrous dispersion of ionically charged nanofibrillar cellulose until the zero-shear viscosity of NFC starts to decrease. Herein "viscosity starts to decrease" means, during the heat treatment, the first sign of negative growth of the viscosity value, which can be obtained by measuring the nanofibrillar cellulose sample taken after certain period of time with a standard viscosity measurement method. The temperature used for heat treatment is dependent on the duration of the treatment; if it is desired shorter treatment time, the temperature can be higher. The zero-shear viscosity value is the value in the region of constant viscosity at small shear stresses. The term "yield stress" refers to the force that is required before a material having plastic behavior starts to flow readily. The yield stress can be determined from a steady state flow curve measured with a stress controlled rheometer. When the viscosity is plotted as function of applied shear stress, a dramatic decrease in viscosity is seen after exceeding the critical shear stress.

In an embodiment, the heat treatment is performed under a pressure set sufficiently high to prevent water from boiling.

Advantageously, the heat treatment is performed at a temperature in the range of 90-180° C., preferably 100-150° C., most preferably between 120-140° C.

In an embodiment, the ionically charged nanofibrillar cellulose is oxidized nanofibrillar cellulose obtained by oxidizing cellulose through N-oxyl mediated catalytic oxidation followed by fibrillating the oxidized cellulose. Preferably, the oxidized cellulose has the carboxylate content of at least 0.5 mmol COOH/g pulp, preferably in the range of 0.5-2.5 mmol COOH/g pulp, more preferably 0.7-1.2 mmol COOH/g pulp, and most preferably 0.9-1.1 mmol COOH/g pulp.

Alternatively, the ionically charged nanofibrillar cellulose is carboxymethylated nanofibrillar cellulose. Preferably, the carboxymethylated nanofibrillar cellulose has the degree of substitution in the range of 0.05-0.3, preferably 0.1 to 0.25.

In an embodiment, the method further comprises applying shear forces to the heat-treated nanofibrillar cellulose. In another embodiment, the zero-shear viscosity of the nanofibrillar cellulose subjected to shear forces is at least 80% of the zero-shear viscosity before the heat treatment, when measured at 0.5%.

In an embodiment of the method, the heat treatment is performed in a pressurized chamber where the gas composition is adjusted so that there is less oxygen or no oxygen. In one example, the gas composition is adjusted by adding some other gas such as nitrogen.

Advantageously, the method further comprises a step of mechanically fibrillation after the heat treatment.

DETAILED DESCRIPTION OF THE PREFERRED EMBODIMENTS

Figure 1:
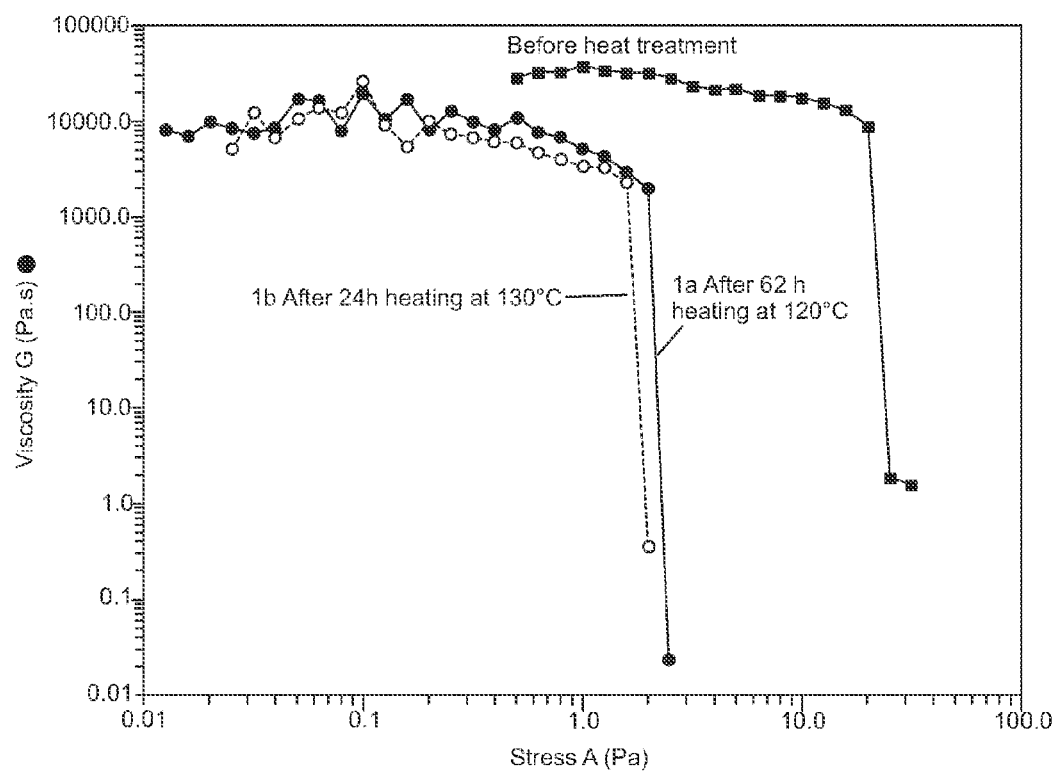
FIG. 1 shows the properties of oxidized NFC (0.82 mmol COOH/g pulp) measured with a rheometer before the heat treatment and after the heat-treatment and agitation.

In the following disclosure, all percent values are by weight, if not indicated otherwise. Further, all numerical ranges given include the upper and lower values of the ranges, if not indicated otherwise.

In the present application all results shown and calculations made, whenever they are related to the amount of pulp, are made on the basis of dry pulp.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 micrometer. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is normally carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant cellulose material and can also be called "nanofibrillated cellulose".

Now a unique combination of chemical modification and heat treatment to reduce the viscosity of the NFC was found. This nanofibrillar cellulose has lower viscosity with normal fibril size compared to typical fibril cellulose. The lower viscosity of NFC produced by the method can be increased back to the original level. Thus, the viscosity of the NFC produced by the method is reversible. The lower viscosity is beneficial in various applications, such as low viscosity binder, guar-like thickener, low viscosity barrier enhancer and stabilizer of foams. Most importantly, it is possible to raise back the viscosity by agitation when higher viscosity is needed.

The surface of original, unmodified cellulose in the fibrous starting material is charged ionically in a chemical pretreatment before the mechanical disruptive treatment. In this way the internal bonds in the cellulose between the microfibrils is weakened, and it is thus possible to enhance the separation of nanofibrils. Some methods for charging the cellulose can be given as example. Oxidation pretreatment of cellulose before the mechanical disruptive treatment is a promising method for surface modification of native cellulose, by which carboxylate and aldehyde functional groups can be introduced into solid native cellulose under aqueous and mild conditions. When native cellulose is used, the oxidation occurs at the surface of the microfibrils, which become negatively (anionically) charged and subsequently results in repulsion of the nanofibers, thus easing fibrillation. Cellulose obtained through N-oxyl mediated catalytic oxidation, e.g. through 2,2,6,6-tetramethyl-1-piperidine N-oxide, known by abbreviation "TEMPO", or carboxymethylated cellulose are examples of anionically charged nanofibrillar cellulose where the anionic charge is due to a dissociated carboxylic acid moiety. Cellulose derivative where the cellulose contains quaternary ammonium groups is an example of cationically charged nanofibrillar cellulose.

According to one embodiment of the method, primary alcohols of cellulose are oxidized to aldehydes and carboxylic acids through N-oxyl mediated catalytic oxidation, for example through TEMPO, by using sodium hypochlorite as the main oxidant. Regarding the finding that low degree of oxidation does not allow efficient enough fibrillation and higher degree of oxidation inflicts degradation of cellulose after mechanical disruptive treatment, the carboxylate content of the oxidized cellulose may be at least 0.5 mmol COON/g pulp, especially 0.5-2.5 mmol COOH/g pulp, preferably 0.7-1.2 mmol COOH/g pulp, most preferably 0.9-1.1 mmol COOH/g pulp.

According to another embodiment of the method, the cellulose is carboxymethylated.

The catalytic oxidation does not change the crystalline structure of the cellulose, but the crystalline structure remains "cellulose I" also in the oxidized cellulose.

Then, the oxidized cellulose is subjected to a mechanical process of fibrillating. Said mechanical process may be pre-fibrillation, dispergation or grinding. According to one embodiment of the method, the mechanical process of fibrillating is conducted in a high pressure homogenizer, and according to another embodiment, a fluidizer is used. In this context, fibrillating means disintegrating the fibers to microfibrils, not to be confused with the method where fibrils are only made to protrude from the surface of the pulp fibers.

Fluidizers and homogenizers are known in fibrillating fibrous dispersions into microfibrils, and the process is based on the use of high pressure and shear forces at high speeds when the dispersion is forced through a small gap. Fluidizers of Microfluidics and homogenizers of GEA can be mentioned as two examples. Fibrous dispersions can also be made to microfibrils by laboratory refiners, such as Masuko supermasscolloider. Fibrous dispersions can also be made to microfibrils by utilizing a so-called rotor-rotor dispergator, where a series of frequently repeated impacts to the dispersion are caused by blades of several rotors that rotate in opposite directions. Atrex dispergator is an example of such dispergator.

The invention is not limited to anionically charged nanofibrillar cellulose, but cationically charged nanofibrillar cellulose can be used as well, if the pretreatment is performed carefully enough so that the crystalline structure of the cellulose is not altered and it is "cellulose I" also in the chemically modified form.

In the method, chemically modified pulp, for example anionic pulp, was mechanically fibrillated to obtain NFC gel. After that, NFC gel was heat-treated at, for example, 90-180° C. under pressure (since NFC is in aqueous media). NFC is kept in elevated temperature for required time from few minutes to several hours. The temperature used is dependent on the duration of the treatment; if it is desired shorter treatment time, the temperature can be higher. The pressure used is set sufficiently high to prevent water from boiling. The gas composition in the pressurized vessel may be adjusted in such a way that there is less oxygen or no oxygen which causes a yellowing or brown color of the NFC upon heating. Oxygen in the vessel can be removed, for example, by adding inert gas such as nitrogen. Heat-treatment is done after the pre-fibrillation/dispergation/grinding step(s). After the heat-treatment in the pressurized vessel, an additional fibrillation/dispergation/grinding step is optionally performed.

The applicant has surprisingly found that heat-treatment breaks the remaining fiber fragments and changes the gel structure and as a result, the gel material having low zero-shear viscosity and yield stress while still preserving the original size and desirable properties of NFC is achieved. On the contrast, typical polysaccharide viscosifiers, such as Guar and Xanthan, are totally destroyed by similar treatment. On the other hand, chemically native NFC is not affected by heat-treatment. In addition, heat-treatment is more effective for highly anionic grades.

The applicant has further found that, although the size of fibrils does not change, the texture of the gel becomes different in the heat treatment. After the heat treatment, the fibrils have gathered to "lumps" of about 100 micrometers. In a typical NFC composition, the most fibrillar entities have the particle size in the range of 1-500 μm. The volume median particle size of these fibrillar entities is equal to or above 20 μm, especially in the range of 20-500 μm, the particle sizes of non-spherical entities being calculated as e.s.d (equivalent spherical diameter).

Further, it was found that the pH of the NFC gel decreased as the result of the heat treatment below 6.0, if the starting pH of the gel was about 7.

Furthermore, the applicant has found that, the higher viscosity can be recovered when high shear forces are applied to the "low viscosity heat treated product", such as by agitating it intensively, for example, in a blender, or by allowing it flow past a fixed element at high speed, such as in blade coating.

The composition, whether low-viscosity or reverted to higher viscosity, contains NFC fibrils dispersed in liquid medium. The composition is preferably water-based, that is, the NFC exists in aqueous gel (hydrogel).

Rheometer Viscosity

The NFC is diluted with deionized water to a concentration of 0.5 w % and 200 g of the mixture is homogenized with a Büchi-mixer (B-400, max 2100 W, Büchi Labortechnik AG, Switzerland) for 3×10 s.

The viscosity of the NFC dispersions is measured at 22° C. with a stress controlled rotational rheometer (AR-G2, TA Instruments, UK) equipped with a narrow gap vane geometry (diameter 28 mm, length 42 mm) in a cylindrical sample cup having a diameter of 30 mm. After loading the samples to the rheometer they are allowed to rest for 5 min before the measurement is started. The steady state viscosity is measured with a gradually increasing shear stress (proportional to applied torque) and the shear rate (proportional to angular velocity) is measured. The reported viscosity (=shear stress/shear rate) at a certain shear stress is recorded after reaching a constant shear rate or after a maximum time of 2 min. The measurement is stopped when a shear rate of 1000 s-1 is exceeded. The method is used for determining zero-shear viscosity.

EXAMPLES

Samples of chemically treated NFC, native NFC, Xanthan gum and Guar gum were prepared and heat-treated, and the properties of them were measured with a rheometer before and after the heat-treatment in the concentration of 0.5%. A further step of agitation after heat treatment was performed on the heat-treated samples and the changes in morphology and viscosity were examined.

Example 1

General Example of Preparing Oxidized NFC

Samples of oxidized NFC were prepared. Firstly, primary alcohols of cellulose was oxidized to aldehydes and carboxylic acids through TEMPO oxidation by using sodium hypochlorite as the main oxidant to obtain oxidized cellulose with a certain carboxylate content expressed as mmol COOH/g pulp, whereafter the oxidized pulp was fibrillated to NFC.

Example 2

Oxidized cellulose with 1.03 mmol COOH/g was prepared using the same method as described in Example 1. Then, the oxidized cellulose was fibrillated in low concentration (2.5%) aqueous dispersion with rotor-rotor dispergator (Atrex) to obtain oxidized NFC. After the fibrillation, heat treatment was performed in a 500 mL Büchi reactor (stainless steel) on 450 g sample of NFC. The sample was dispersed with Waring blender 10 seconds for 3 times and then placed in 138° C. oil bath for 24 hours. The sample temperature was kept at 130° C. and the pressure inside the Büchi reactor was kept at an overpressure of between 1.5-2 bar. During the treatment the sample was mixed by using an anchor blade at around 80 rpm.

Figure 2:
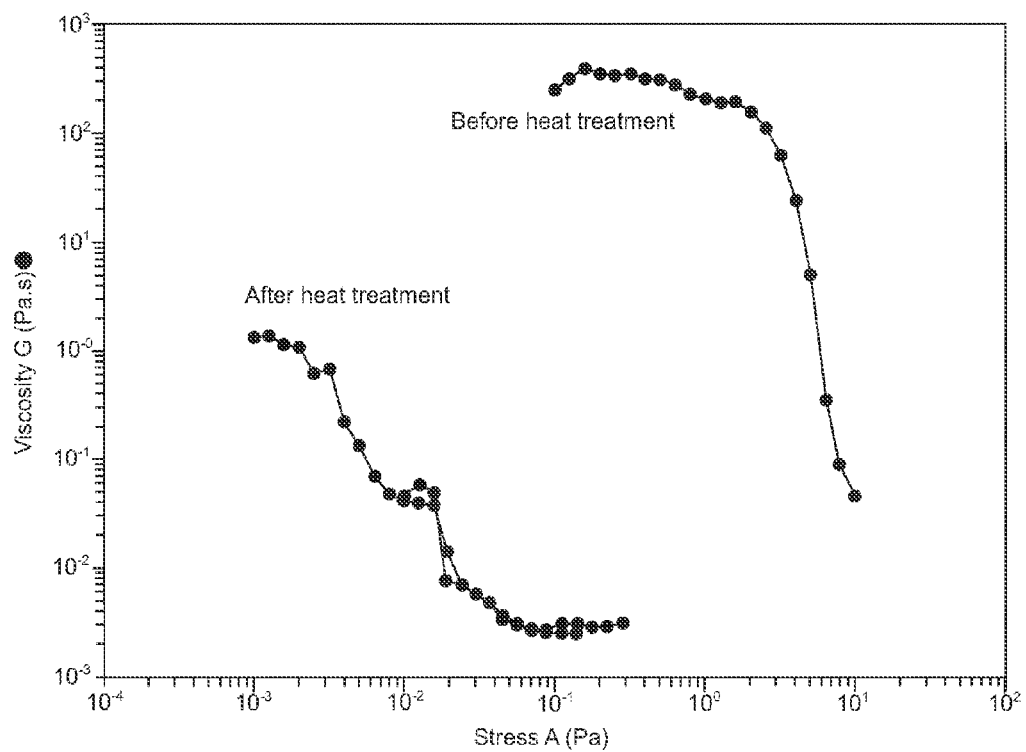
FIG. 2 shows the properties of oxidized NFC (1.03 mmol COOH/g pulp) measured with a rheometer before and after the heat-treatment.
Figure 3:
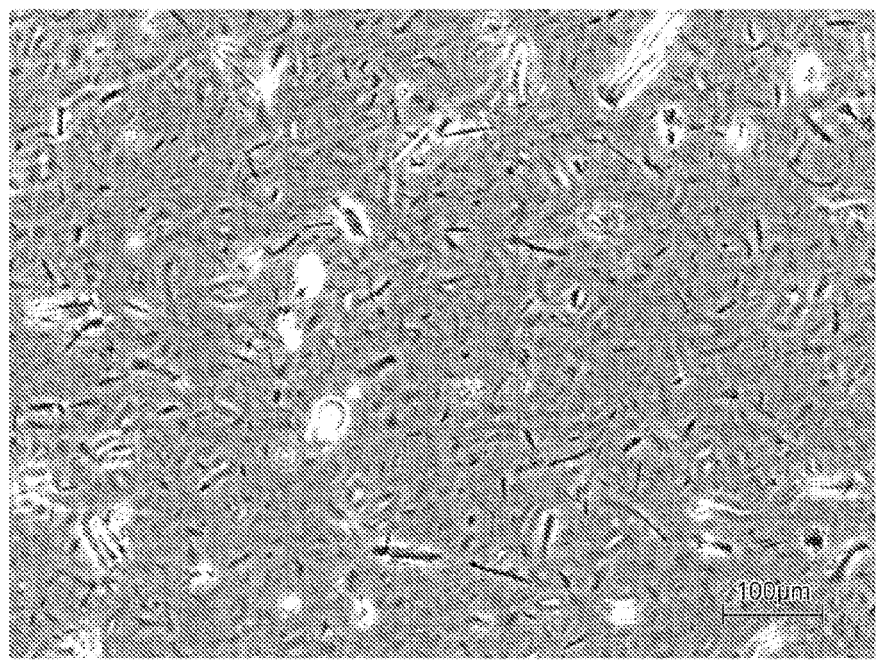
FIG. 3 shows the microscopic image of the oxidized NFC before and after the heat-treatment.
Figure 3:
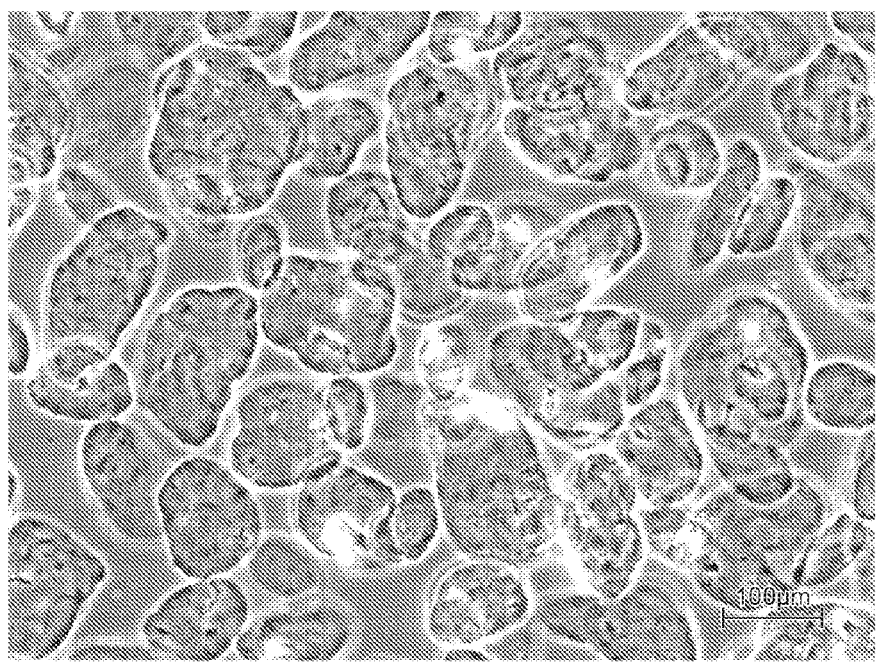

The pH values of the sample before and after the heat treatment were 7.4 and 5.1, respectively. The results measured with a rheometer before and after the heat-treatment are shown in FIG. 2. As can been seen in FIG. 2, both the zero-shear viscosity and yield stress decreased clearly after the heat treatment. The microscopic image of the sample before (A) and after (B) the heat treatment is shown in FIG. 3. The length of the scale bar is 100 micrometers. As can be seen in FIG. 3, after the heat treatment, fibrils have gathered to fibrillar entities or "lumps" of about 100 micrometers.

Example 3

A sample of carboxymethylated cellulose was prepared, which sample has a degree of substitution (DS) of 0.14, and then it was fibrillated in 0.9% concentration with Masuko Supermasscolloider to obtain carboxymethylated NFC. After the fibrillation, heat treatment was performed in a 500 mL Büchi reactor (stainless steel) on 450 g sample of NFC. The sample was dispersed with Waring blender 10 seconds for 3 times and then placed in 138° C. oil bath for 24 hours.

The sample temperature was kept at 130° C. and the pressure inside the Büchi reactor was kept at an overpressure of around 2 bar. During the treatment the sample was mixed by using an anchor blade at around 80 rpm.

Figure 4:
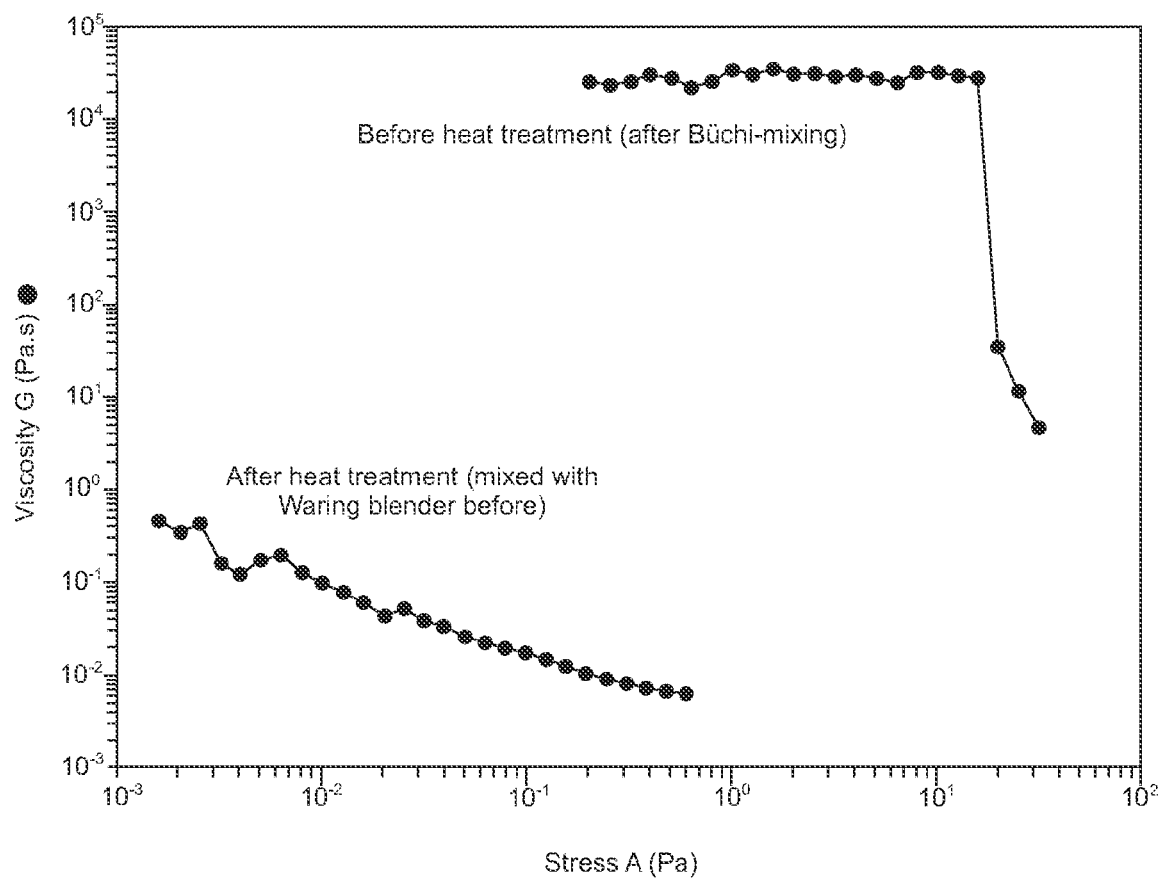
FIG. 4 shows the properties of carboxymethylated NFC (DS 0.14) measured with a rheometer before and after the heat-treatment.

The pH values of the sample before and after the heat treatment were 7.6 and 5.3, respectively. The results measured with a rheometer before and after the heat-treatment are shown in FIG. 4. As can been seen in FIG. 4, the viscosity decreased clearly after the heat treatment.

Example 4

Comparative Example

A sample of native NFC was obtained by fibrillating native cellulose in 3% concentration with Masuko Super mass colloider for 3 passes. After the fibrillation, heat treatment was performed in a 500 mL Büchi reactor (stainless steel) on 450 g sample of NFC. The sample was dispersed with Waring blender 10 seconds for 3 times and then placed in 138° C. oil bath for 24 hours. The sample temperature was kept at 130° C. and the pressure inside the Büchi reactor was kept at an overpressure of around 2 bar. During the treatment the sample was mixed by using small an anchor blade at around 80 rpm.

Figure 5A:
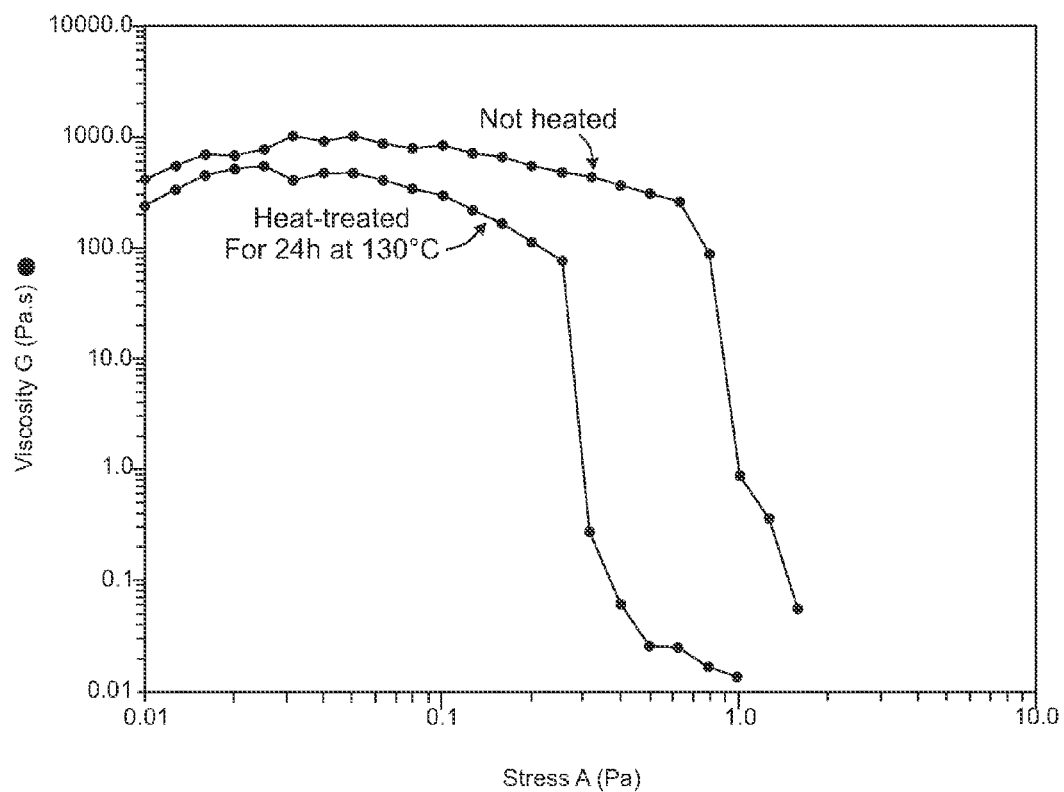
FIG. 5a shows the properties of native NFC measured with a rheometer before and after the heat-treatment.
Figure 5B:
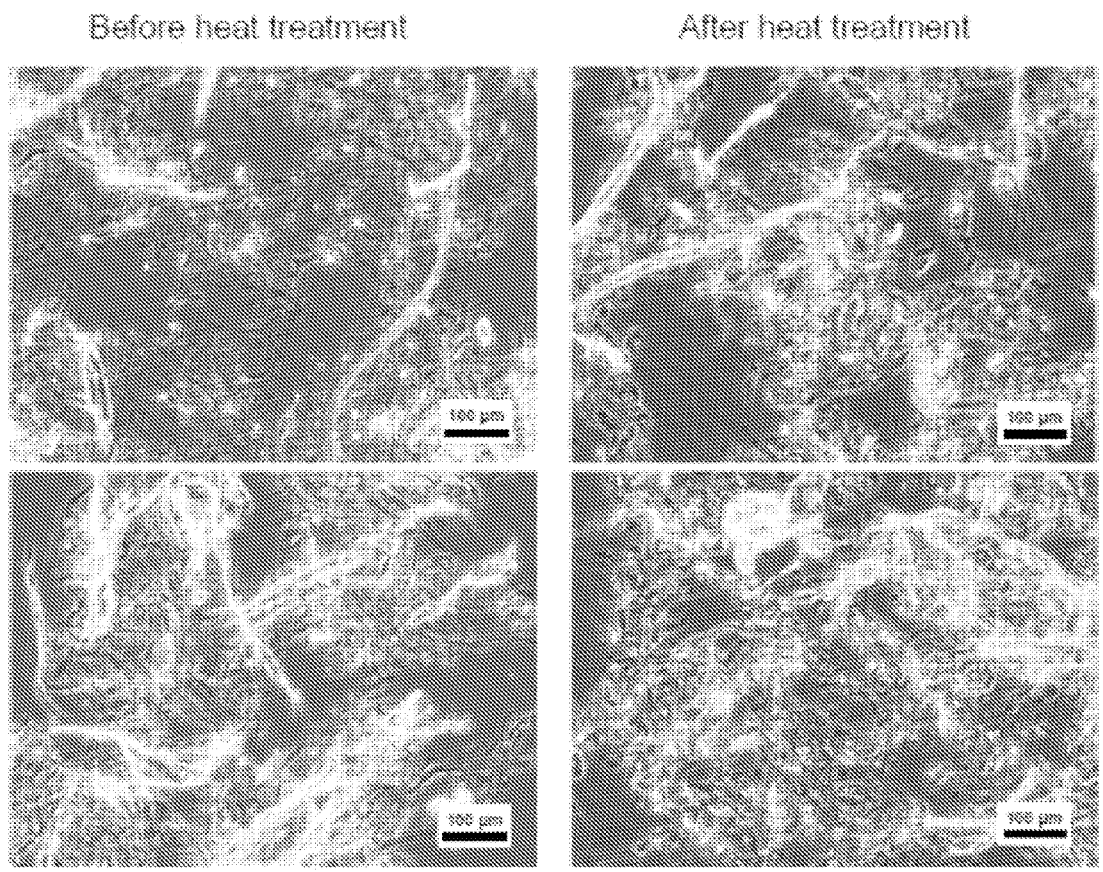
FIG. 5b shows the microscopic images of the native NFC.

The pH values of the sample before and after the heat treatment were 6.7 and 5.0, respectively. The results measured with a rheometer before and after the heat-treatment are shown in FIG. 5a. There was no clear change in the viscosity. The microscopic images of FIG. 5b show, that here is no visual difference between the heat-treated and untreated gel. It was also noticed that the native NFC sedimented after the heat treatment.

Example 5

Comparative Example

A sample of Xanthan gum (UPM Kymmene Oy) in 87.7% concentration was prepared, and then heat treatment was performed in a 500 mL Büchi reactor (stainless steel) on 450 g sample of Xanthan gum. The sample was dispersed on the previous day under magnetic stirring, followed by with a hand-mixer, and then the sample was placed in 138° C. oil bath for 24 hours. The sample temperature was kept at 130° C. and the pressure inside the Büchi reactor was kept at an overpressure of between 1.5-2 bar. During the treatment, the sample was mixed by using small an anchor blade at around 80 rpm.

Figure 6:
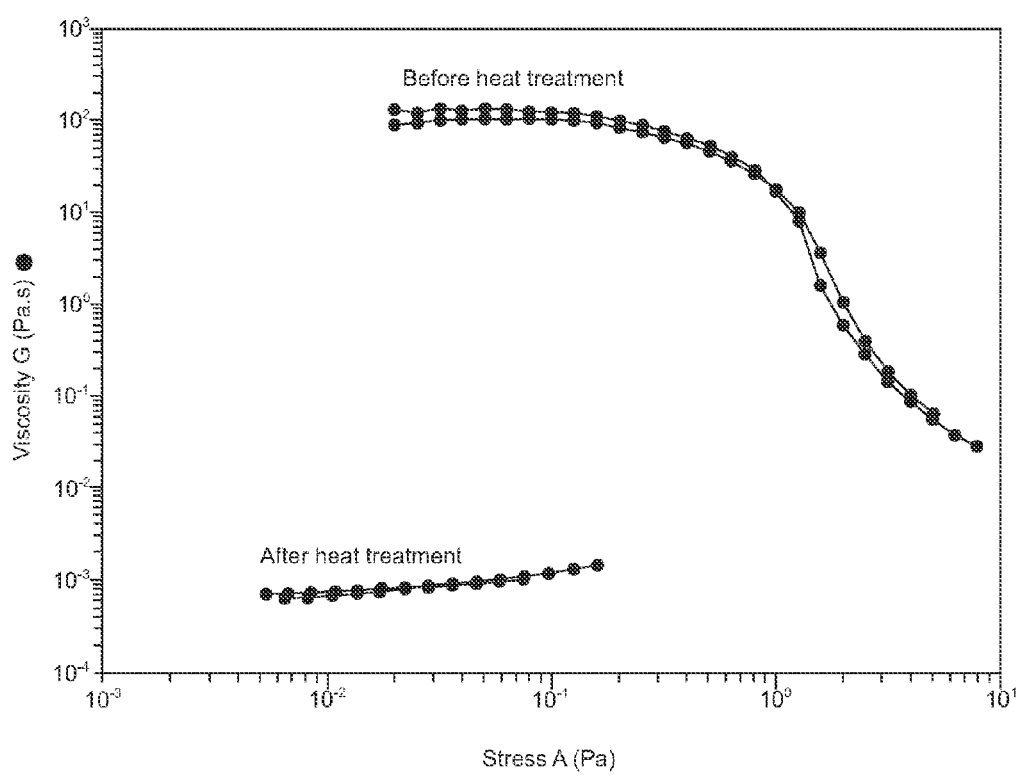
FIG. 6 shows the properties of Xanthan gum measured with a rheometer before and after the heat-treatment.

The pH values of the sample before and after the heat treatment were 5.7 and 4.2, respectively. The results measured with a rheometer before and after the heat-treatment are shown in FIG. 6. As can be seen in FIG. 6, the sample lost the viscosity properties after the heat treatment.

Example 6

Comparative Example

A sample of Guar gum (Chemtotal Labs) in 90.8% concentration was prepared and then heat treatment was performed in a 500 mL Büchi reactor (stainless steel) on 450 g sample of Guar gum. The sample was dispersed on the previous day under magnetic stirring, followed by with Waring blender, and then the sample was placed in 138° C. oil bath for 24 hours. The sample temperature was kept at 130° C. and the pressure inside the Büchi reactor was kept at an overpressure of between 1.5-2 bar. Afterwards, the sample was mixed by using small an anchor blade at around 100 rpm.

Figure 7:
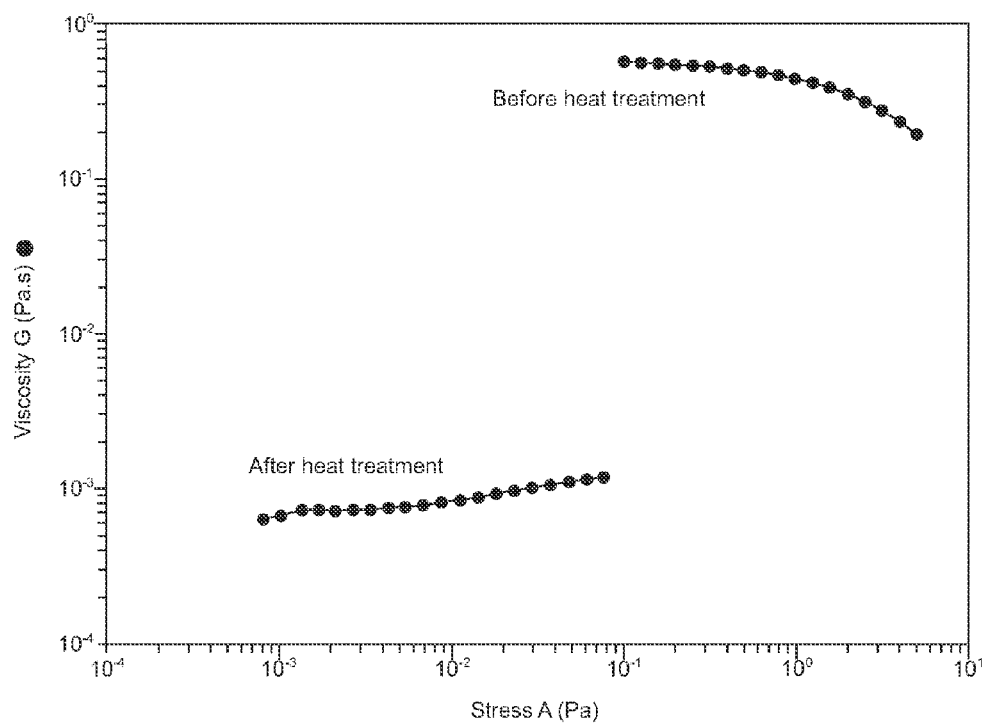
FIG. 7 shows the properties of Guar gum measured with a rheometer before and after the heat-treatment.

The pH values of the sample before and after the heat treatment were 4.9 and 4.9, respectively. The results measured with a rheometer before and after the heat-treatment are shown in FIG. 7. As can be seen in FIG. 7, the sample lost the viscosity properties after the heat treatment.

Example 7

Oxidized cellulose with 1.03 mmol COOH/g was prepared using the same method as described in Example 1. Then, the oxidized cellulose was fibrillated in low concentration (2.6%) aqueous dispersion with rotor-rotor dispergator (Atrex) to obtain oxidized NFC. After the fibrillation, heat treatment was performed in a 500 mL Büchi reactor (stainless steel) on 450 g sample of NFC. 600 g of 0.5% sample was dispersed with Waring blender 10 seconds for 3 times and then placed in 138° C. oil bath for 24 hours. The sample temperature was kept at 130° C. and the pressure inside the Büchi reactor was kept at an overpressure of between 1.5-2 bar. During the treatment, the sample was mixed by using an anchor blade at around 100 rpm.

The heat-treated sample was then agitated with Waring blender 10 seconds for 3 times.

Figure 8:
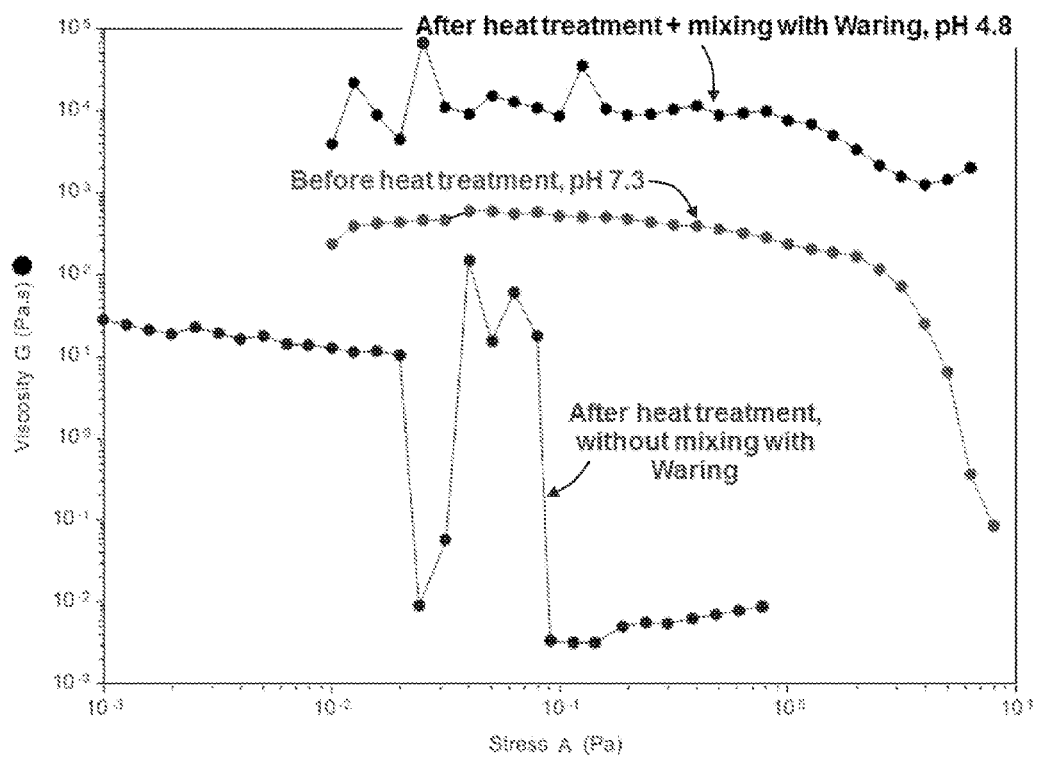
FIG. 8 shows the properties of oxidized NFC (1.03 mmol COOH/g pulp) measured with a rheometer before and after the heat-treatment (130° C., 24 h), as well as after the agitation.
Figure 9:
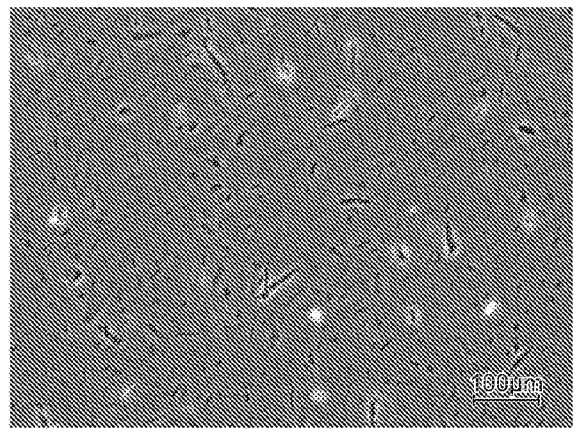
FIG. 9 shows the microscopic image of the oxidized NFC (1.03 mmol COOH/g pulp) before and after the heat-treatment (130° C., 24 h), as well as after the agitation.
Figure 9:
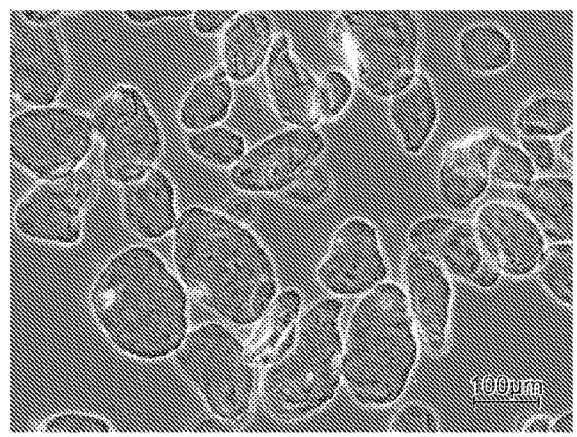
Figure 9:
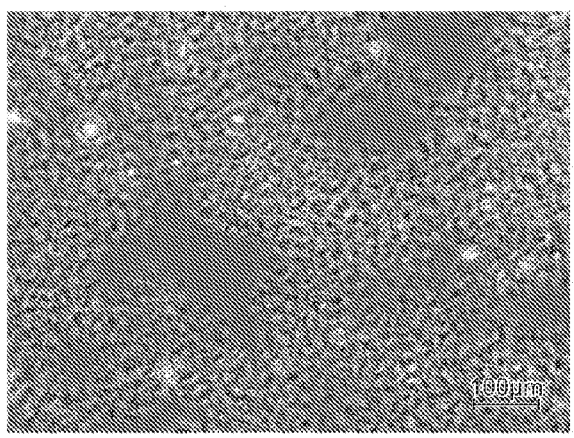

The pH values of the sample before and after the heat treatment were 7.3 and 4.8, respectively. The results measured with a rheometer before and after the heat-treatment, as well as after the agitation, are shown in FIG. 8. As can be seen in FIG. 8, the viscosity dropped after the heat treatment, and surprisingly, after the agitation, the viscosity raised back to above the original level. The microscopic image of the sample before (A) and after (B) the heat treatment, as well as after the agitation (C), is shown in FIG. 9. The length of the scale bar is 100 micrometers. As can be seen in FIG. 9, after the heat treatment, fibrils have gathered to fibrillar entities or "lumps" of about 100 micrometers, and after the agitation, the lumps were broken into small pieces.

Figure 10:
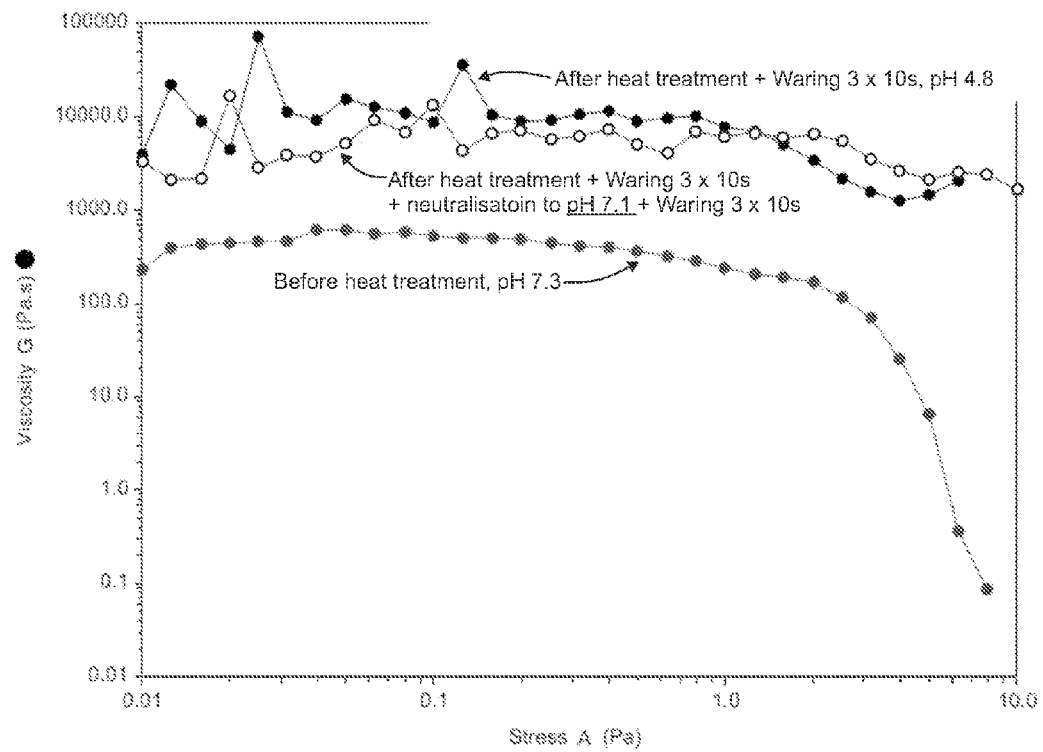
FIG. 10 shows the the properties of oxidized NFC (1.03 mmol COOH/g pulp) measured with a rheometer before the heat-treatment (130° C., 24 h), after the agitation, and after the neutralization.

The sample was neutralized and the result is shown in FIG. 10. As can be seen in FIG. 10, the viscosity value is not dependent on pH.

Example 8

Oxidized cellulose with 1.03 mmol COOH/g was prepared using the same method as described in Example 1. Then, the oxidized cellulose was fibrillated in low concentration (2.6%) aqueous dispersion with rotor-rotor dispergator (Atrex) to obtain oxidized NFC. After the fibrillation, heat treatment was performed in a 500 mL Büchi reactor (stainless steel) on 450 g sample of NFC. 600 g of 0.5% sample was dispersed with Waring blender 10 seconds for 3 times and then placed in 150° C. oil bath for 24 hours. The sample temperature was kept at 142° C. and the pressure inside the Büchi reactor was kept at an overpressure of between 1.5-2 bar. During the treatment, the sample was mixed by using an anchor blade at around 100 rpm.

The heat-treated sample was then agitated with Waring blender 10 seconds for 3 times.

Figure 11:
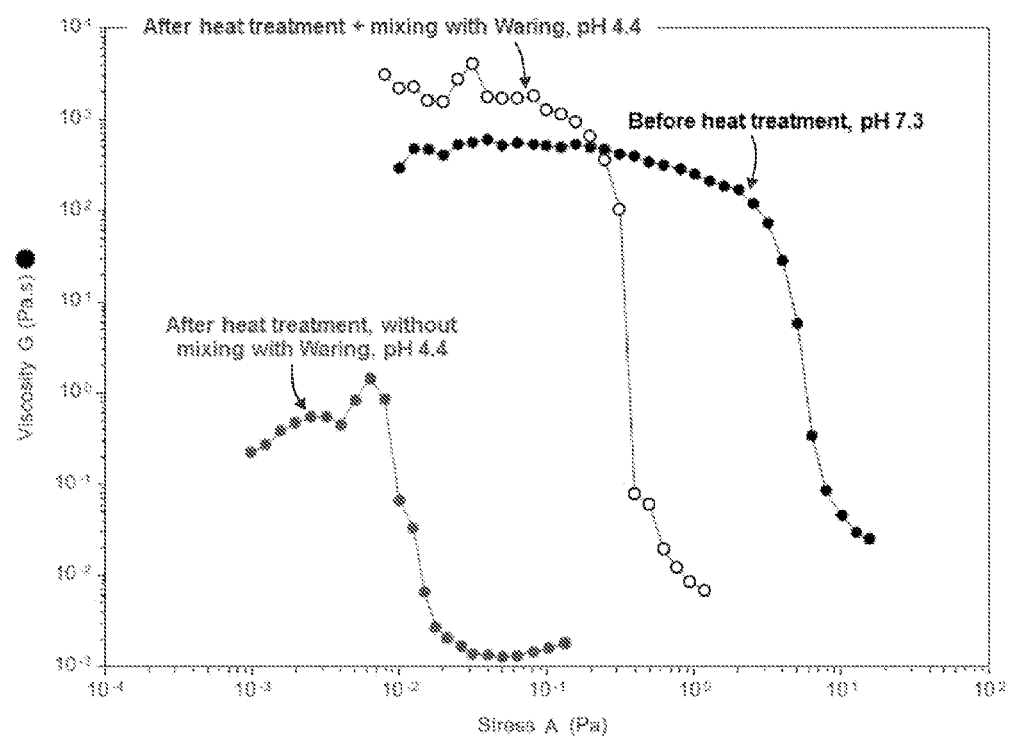
FIG. 11 shows the properties of oxidized NFC (1.03 mmol COOH/g pulp) measured with a rheometer before and after the heat-treatment (142° C., 24 h), as well as after the agitation.

The pH values of the sample before and after the heat treatment were 7.3 and 4.4, respectively. The results measured with a rheometer before and after the heat-treatment, as well as after the agitation, are shown in FIG. 11.

Figure 12:
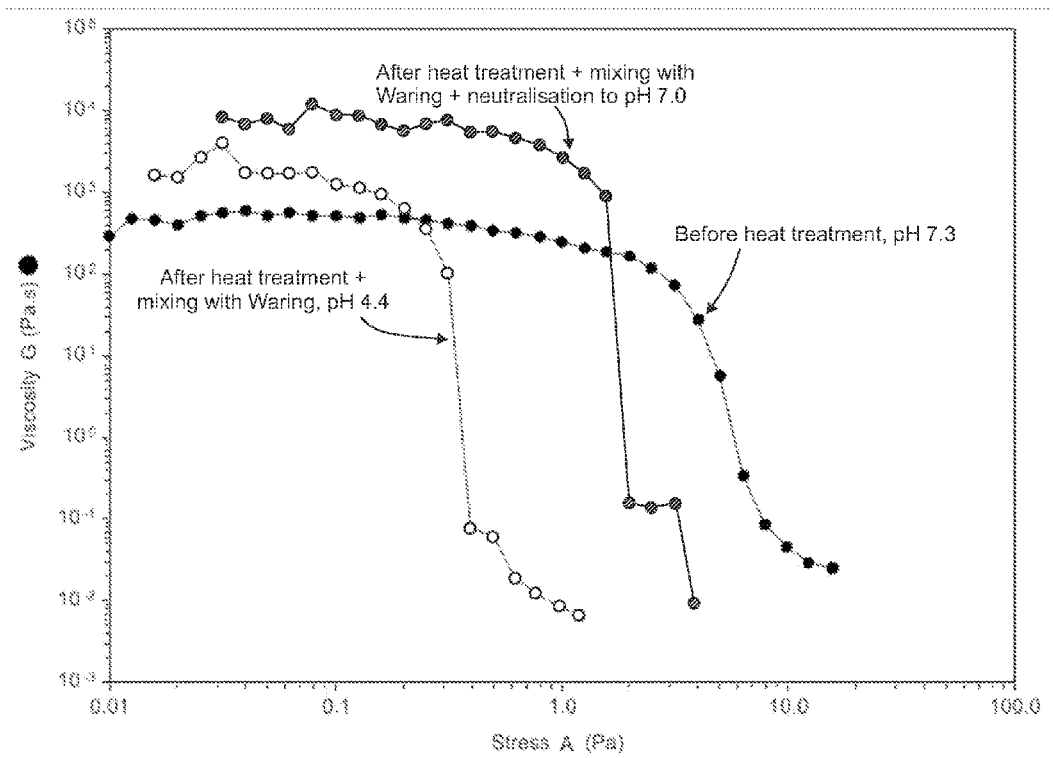
FIG. 12 shows the the properties of oxidized NFC (1.03 mmol COOH/g pulp) measured with a rheometer before the heat-treatment (142° C., 24 h), after the agitation, and after the neutralization.

The sample was neutralized and the result is shown in FIG. 12. As can be seen in FIG. 12, the pH value has no remarkable effect on zero-shear viscosity.

Example 9

Oxidized cellulose with 0.82 mmol COOH/g was prepared using the same method as described in Example 1 Then, the oxidized cellulose was fibrillated in a low concentration (2.5%) aqueous dispersion with rotor-rotor dispergator (Atrex) to obtain oxidized NFC. After the fibrillation, heat treatment was performed in a 500 mL Büchi reactor (stainless steel) on 450 g sample (0.5% NFC dispersion). The pressure inside the Büchi reactor was kept at an overpressure of around 2 bar during the heat treatment.

Sample 1a was dispersed with Waring blender 10 seconds for 3 times and then placed in 130° C. oil bath for 62.5 hours. The sample temperature was kept at 120° C. There was no mixing during the heat treatment.

Sample 1b was dispersed with Waring blender 10 seconds for 3 times and then placed in 138° C. oil bath for 24 hours. The sample temperature was kept at 130° C. During the treatment, the sample was mixed by using a small propeller blade at around 80 rpm.

The heat-treated samples were then agitated with Waring blender 10 seconds for 3 times.

The pH values of the sample before and after the heat treatment were 7.0 and 5.7, respectively. The results measured with a rheometer before the heat treatment and after the heat-treatment and agitation are shown in FIG. 1. The viscosity showed the same tendency as with NFC having higher carboxylate content (examples 7 and 8), that is, the viscosity was reversible.

Example 10

Comparative Example

Figure 13:
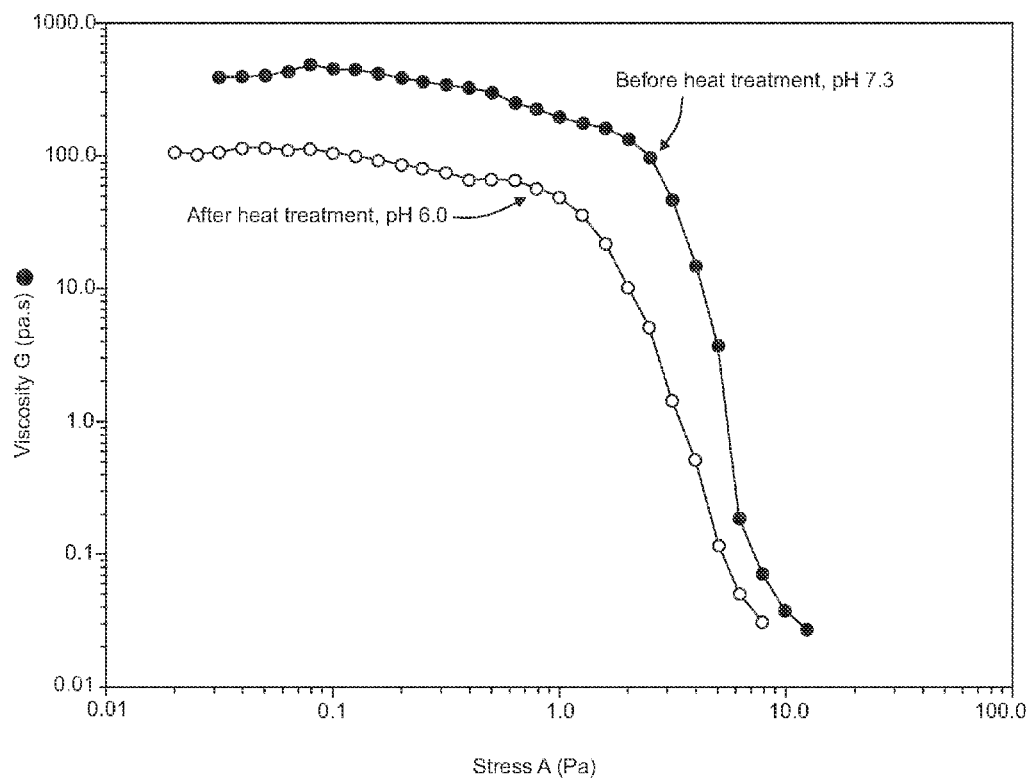
FIG. 13 shows the properties of oxidized NFC (1.03 mmol COOH/g pulp) measured with a rheometer before and after the heat-treatment (80° C., 24 h).
Figure 14:
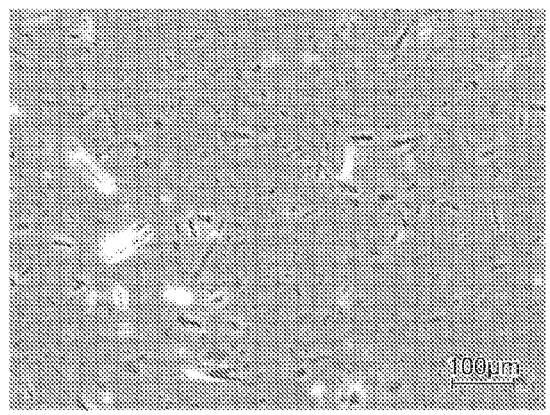
FIG. 14 shows the microscopic images of NFC samples before and after heat treatment at 80° C.
Figure 14:
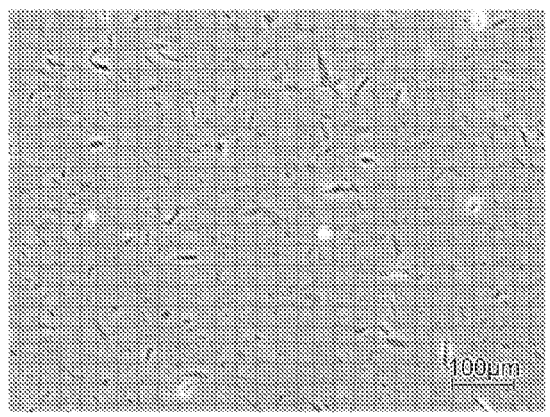
Figure 14:
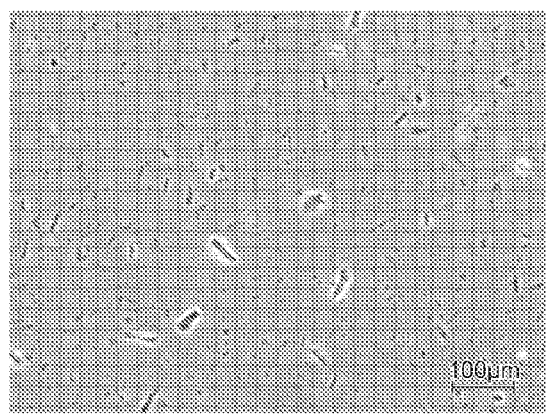

Oxidized nanofibrillar cellulose sample from example 8 was heat treated at 80° C. 450 g sample of NFC was heated in 80° C. for 24 hours. The sample was mixed by using an anchor blade at around 100 rpm. The pH values of the sample before and after the heat treatment were 7.3 and 6.0, respectively. The results measured with a rheometer before and after the heat-treatment are shown in FIG. 13. As can be seen in FIG. 13, the viscosity dropped only slightly, result comparable to heat treatment of native NFC, in example 4. The microscopic image of the sample before (A) and after (B) the heat treatment, as well as after the agitation (C), is shown in FIG. 14. The length of the scale bar is 100 micrometers. As can be seen in FIG. 14, no notable change in gel structure can be seen after the heat treatment in 80° C.

The starting pH of the NFC gel can be higher than shown above in the examples, because the pH value decreases as a result of the heat treatment. The starting pH can be well in the basic range, for example above 8.

Especially the oxidized NFC (containing carboxylate groups) stands the heat treatment well and the higher viscosity can even be recovered after heat treatment by suitable agitation. This is surprising, because usually chemically modified NFC is supposed to be more sensitive compared with the native NFC. Because of the heat-resistance, the NFC with lowered viscosity will also retain its viscosity when it is used at elevated temperatures (for example between 100-150° C.) in conditions where the liquid medium does not boil.

If desired, the nanofibrillar cellulose can be fibrillated further after the heat treatment by mechanical energy, for example in a homogenizer. This is preferably made for nanofibrillar cellulose whose viscosity has been restored.

The nanofibrillar cellulose having lowered viscosity as result of the heat treatment has many potential uses, one of which is the pickering stability of heterogeneous systems comprising two immiscible phases which form a dispersion. The nanofibrillar cellulose can be used especially in foam stabilization in oil drilling, foam explosives, or in a so-called foam forming technology. In foam forming, air is mixed to water-based fiber furnish containing structural fibers (such as papermaking fibers) surfactant, and nanofibrillar cellulose as foam stabilisator. The obtained composition is used for forming fibrous sheet-like products, such as mainly porous, smooth and lightweight paper products. However, the applications of the nanofibrillar cellulose are not limited to the stabilization of the above-mentioned compositions and to the stabilization of the heterogeneous systems in general. The NFC can also be used in other fields where its rheological properties can be utilized.

Especially for use in oilfield applications, the easily flowable NFC composition resembles Guar-like viscosifiers, and similar application potential can be achieved with this composition. Further, in oilfield applications where the aqueous NFC composition is introduced into deep layers of bedrock where the temperature can be high (even exceeding 100° C. under pressure), the good heat-resistance of the NFC is advantageous. This is true especially for the oxidized NFC (containing carboxyl groups, for example 0.5-1.2 mmol COOH/g pulp), where the viscosity can even be restored after the use. This means that the NFC can be used several times even if its viscosity decreases during the use. The viscosity can be restored at the site of use by suitable treatment, which applies high shear forces to the NFC composition whose viscosity reduced during the use. such treatment can be performed by an agitator, dispergator (rotor-stator or rotot-rotor dispergator), homogenizer, or any other device with efficient mixing power to apply high shear forces to the NFC composition.

One application where the lowered reversible viscosity of the NFC composition is useful is papermaking (including making board as well). The NFC can be used as constituent in coating pastes, either as such or mixed with other ingredients, such as pigments. The aqueous NFC composition is easily pumpable and applicable on the base paper or base board even at higher concentrations (about 5%), and the fibrillar entities can be broken and the viscosity can be restored during the coating by applying high shear forces to the layer of the NFC on the paper or board, for example by the effect of the coating blade in blade coating method. Further, the NFC composition can be used in the body of the paper or board among the fibers, preferably so that at some stage the furnish containing the NFC is subjected to homogenization or other treatment applying high shear forces to the NFC to break the fibrillar entities and restore the viscosity.

The invention claimed is:

1. A method for modifying nanofibrillar cellulose composition, comprising
   preparing fibrous dispersion of ionically charged nanofibrillar cellulose (NFC),
   applying heat treatment at a temperature of at least 90° C. to the fibrous dispersion until first sign of negative growth of the viscosity value of the nanofibrillar cellulose.

2. The method according to claim 1, wherein the applying heat treatment decreases the zero shear viscosity of the nanofibrillar cellulose composition below 100 Pa·s, as measured in 0.5% concentration of NFC.

3. The method according to claim 1, wherein the heat treatment is performed under a pressure set sufficiently high to prevent liquid medium of the dispersion, such as water, from boiling.

4. The method according to claim 1, wherein the heat treatment is performed at a temperature in the range of 90-180° C..

5. The method according to claim 1, wherein the ionically charged nanofibrillar cellulose is oxidized nanofibrillar cellulose obtained by oxidizing cellulose through N-oxyl mediated catalytic oxidation followed by fibrillating the oxidized cellulose.

6. The method according to claim 5, wherein the oxidized cellulose has the carboxylate content of at least 0.5 mmol COOH/g pulp.

7. The method according to claim 5, wherein the oxidized cellulose has the carboxylate content of 0.5 - 2.5 mmol COOH/g pulp.

8. The method according to claim 5, wherein the oxidized cellulose has the carboxylate content of 0.7-1.2 mmol COOH/g pulp.

9. The method according to claim 5, wherein the oxidized cellulose has the carboxylate content of 0.9-1.1 mmol COOH/g pulp.

10. The method according to claim 1, wherein the ionically charged nanofibrillar cellulose is carboxymethylated nanofibrillar cellulose.

11. The method according to claim 10, wherein the carboxymethylated nanofibrillar cellulose has the degree of substitution in the range of 0.05 - 0.3.

12. The method according to claim 10, wherein the carboxymethylated nanofibrillar cellulose has the degree of substitution in the range of 0.10 to 0.25.

13. The method according to claim 1, the method further comprises applying shear forces to the heat-treated nanofibrillar cellulose, wherein the zero-shear viscosity of the nanofibrillar cellulose is higher after applying the shear forces, when measured at the concentration of 0.5%.

14. The method according to claim 1, the method further comprises applying shear forces to the heat-treated nanofibrillar cellulose, wherein the zero-shear viscosity of the nanofibrillar cellulose, to which the shear forces were applied, is at least 80% of the zero-shear viscosity before the heat treatment, when measured at 0.5%.

15. The method according to claim 1, wherein the heat treatment is performed in a pressurized chamber where the gas composition is adjusted so that there is less oxygen or no oxygen.

16. The method according to claim 15, wherein the gas composition is adjusted by adding some other gas such as nitrogen.

17. The method according to claim 1, wherein the nanofibrillar cellulose composition is an aqueous gel (hydrogel).

18. The method according to claim 1, wherein the applying heat treatment decreases the zero shear viscosity of the nanofibrillar cellulose composition below 10 Pa·s, as measured in 0.5% concentration of NFC.

19. The method according to claim 1, wherein the applying heat treatment decreases the zero shear viscosity of the nanofibrillar cellulose composition below 5 Pa·s, as measured in 0.5% concentration of NFC.

20. The method according to claim 1, wherein the heat treatment is performed at a temperature in the range of 100-150° C..

21. The method according to claim 1, wherein the heat treatment is performed at a temperature in the range of 120-140° C..

* * * * *